(12) United States Patent
Schnee et al.

(10) Patent No.: US 7,659,820 B2
(45) Date of Patent: Feb. 9, 2010

(54) REMOVABLE DATA STORAGE MEDIA TRACKING SYSTEM

(75) Inventors: Jonathan P. Schnee, Louisville, CO (US); Leslie K. Hodge, Westminster, CO (US); William Lynch, Boulder, CO (US); Michael L. Leonhardt, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 281 days.

(21) Appl. No.: 11/426,072

(22) Filed: Jun. 23, 2006

(65) Prior Publication Data

US 2007/0296581 A1    Dec. 27, 2007

(51) Int. Cl.
*G08B 13/14* (2006.01)
*G06F 17/00* (2006.01)
*G06K 7/00* (2006.01)
*G06K 19/00* (2006.01)
*G06K 19/06* (2006.01)

(52) U.S. Cl. .................. 340/572.1; 340/572.4; 235/375; 235/454; 235/487; 235/494

(58) Field of Classification Search ........................ None
See application file for complete search history.

(56) References Cited

U.S. PATENT DOCUMENTS

| 2004/0119605 | A1* | 6/2004 | Schaper ................. 340/825.49 |
| 2004/0148053 | A1* | 7/2004 | Graushar et al. ............ 700/223 |
| 2005/0284405 | A1 | 12/2005 | Pomakoy-Poole et al. |
| 2007/0095905 | A1* | 5/2007 | Kadaba ...................... 235/384 |

* cited by examiner

*Primary Examiner*—Julie Lieu
(74) *Attorney, Agent, or Firm*—Marsh Fischman & Breyfogle LLP; Kent A. Lembke (57) ABSTRACT

A system for tracking locations of portable data storage media. The system includes media with a wireless tag storing metadata pertaining to its stored data. The tag is adapted to respond to an interrogatory signal by wirelessly transmitting a signal comprising the metadata, e.g., is a high frequency radio frequency identification (RFID) tag powered inductively to transmit contents of its memory. The system includes a stationary and mobile locators that includes tag readers transmitting the interrogatory signals to the media and receiving the metadata signals from the wireless tags. Mobile ones of the locators include a communication module receiving location data (e.g., Global Positioning System (GPS) data) and sending wireless signals made up of the received location data and the received metadata signals. The system includes a media tracker that receives signals from the mobile locator and determines and stores locations of the media typically along with a time stamp.

13 Claims, 4 Drawing Sheets

REMOVABLE DATA STORAGE MEDIA TRACKING SYSTEM

BACKGROUND OF THEY INVENTION

1. Field of the Invention

The present invention relates, in general, to methods and systems for tracking or monitoring portable or removable data storage media, and, more particularly, to software, hardware, systems, and methods for determining a physical location and other characteristics of removable storage media particularly when the storage media is transported in and out of a controlled space such as to offsite archives.

2. Relevant Background

Today's society requires that huge amounts of data be stored for later retrieval. For many enterprises or businesses, important data is stored on portable or removable data storage media such as magnetic tape, magnetic disk, optical tape, optical disk, solid state devices, or the like. The removable storage media allows information to be periodically accessed and when not in use to be removed from the media access device (e.g., a library with tape or disk drives) and placed in controlled areas or spaces that may be onsite for short term storage or transported to offsite archive locations (e.g., large, secure warehouses designed for safely storing such removable data storage media) for long term storage. Removable data storage media may be kept at an offsite archive or warehouse for a number of reasons including to address space constraints of the onsite facility, to comply with disaster recovery policies that require backup copies of data be stored remotely, and to provide a more physically secure storage location.

A serious problem associated with removable data storage media is how to avoid losing any of the media. Loss of media is not only a concern during transport from one location to another (e.g., from an enterprise's data access center to an archive warehouse) but also is a concern within a single location (e.g., misplacing of a tape cartridge within a controlled space, removal of a disk from a controlled space or the like). Within a data center, efforts have been made to track removable data storage media. These techniques include using low frequency radio frequency identification (RFID) tags placed on the media, such as on a tape cartridge, and RFID readers within a media access device, such as a tape library, to wirelessly determine if the expected or correct media has been inserted in a read/write device. Bar code readers may also be used with tape libraries or other media access systems to track the location and to identify tape cartridges within the particular library. Both of these techniques require close proximity between the media and reader to be effective and are only useful within the library or media access system or device.

When a removable data storage media is removed from the access system (e.g., tape library), its physical location is often only tracked with standard manual tracking techniques such as logging of serial numbers of the media with or without support of bar code scanners. For example, a technician may be logged as having possession of tape cartridge but there is no ongoing tracking of the location of the tape cartridge. As a reset, the cartridge and its data may be easily lost. Another concern is that business process rules, such as avoiding storing the cartridge at temperatures above a preset limit or not removing a cartridge from a controlled space, are more likely to be violated.

Additional problems arise with the transport of removable data storage media between controlled spaces separated by uncontrolled spaces and from a controlled space to a data archive facility or warehouse. Generally, the media is removed from a library or other data access device and placed in a shipping container, such as a media magazine with slots or grooves with a form factor matching the particular media such as a tape cartridge. A manual logging or scan of the bar code of each piece of media in the container is typically performed at the controlled space egress point and then, again as the shipping container is received at the destination control space or archive facility and at its final storage destination within the archive facility. The transport process may involve setting a particular route for the media transport and expected times for the transport or even for each leg or portion of the transport. However, existing techniques only track the shipping container but provide no direct information on the location or status of individual pieces of media or related sets of such media (e.g., three tape cartridges within one or more shipping containers may be related to a particular business application or contain specific related information for which all cartridges are needed to recover the information). Some efforts have been made to better track the location of the shipping containers, such as with the use of ID tags on the containers, but such systems fail to provide verification of individual storage media.

These prior techniques provided no confirmation of location or status between the way or check points and often only verified the container rather than individual media within the container. There remains a need for a system for better tracking the physical location and status of individual pieces of removable data storage media. Preferably such a system, and associated methods, would allow an operator to track the physical location of removable data storage media in a variety of domains or physical locales and would readily integrate with existing data management systems.

SUMMARY OF THE INVENTION

The present invention provides a method (and corresponding software and hardware components) for automatic and/or passive tracking the location and, in some cases, status of media even when it is not in a data access system such as a tape library. For example, the tracking method allows an operator to query the location of a specific media via a user interface to the tracking application (or media tracking system). The media may be within a read/write device, within a data access system (e.g., a library), within controlled space (e.g., within controlled areas of a data center or other controlled locations of an enterprise), or in free or uncontrolled space (e.g., in transport to an archive facility or warehouse or on a technician's desk or shelf or the like). In addition to responding to specific queries the media tracking system may be configured to alert information technology (IT) management or others if a media is not where it is "expected" to be such as if it is not on its transport route based on a geographic or time deviation or if its status violates a business process rule such as it is stored in a high temperature or high magnetic field location.

More particularly, a system is provided for tracking the position and status of removable data storage media. The system includes storage media that includes media for storing digital data and includes a wireless tag storing metadata that in some embodiments pertains to the data on the media. The wireless tag is adapted to respond to an interrogatory signal by wirelessly transmitting a signal comprising the metadata, e.g., is an active or passive radio frequency identification (RFID) tag that transmits the contents of its memory or buffer (e.g., up to 2 kilobytes or more of data). The system further includes a locator that includes a tag reader (e.g., a low, high, or other frequency RFID tag reader and antenna) transmitting the interrogatory or polling signals to the storage media and in turn receiving the metadata signals from the wireless tags within the range of the tag reader. The locator further includes a communication module receiving location data (e.g., positioning data from a remote system that is associated with a physical location of the wireless tag such as Global Positioning System (GPS) data, Global Orbiting Navigation Satellite System (GLONASS) data, other satellite positioning data, and/or cellular phone-based positioning data, or any other positioning data useful for determining a location of a wireless device) and sending wireless signals made up of the received location data and also all or portions of the received metadata signals. The system further includes a media tracking system that receives the signals from the locator and determines locations of the storage media (e.g., approximate physical locations based on the location of the locator at the time of receipt of the metadata signals and the range of the tag reader such as within a 5 to 10 foot diameter).

In the system, the media tracking system may operate to associate the determined locations of the storage media with the metadata and an identifier for each of the storage media. Further, the locator may provide a time stamp indicative of when the metadata was received (e.g., the timing of a read event), and this further information may be linked to the metadata and stored in memory for later use. The system may further include a number of stationary locators in or near a controlled space that each includes a tag reader that periodically transmits polling or interrogatory signals to awaken any of the wireless tags within the range of the stationary locator. Each of the stationary locators also includes a communication module for communicating any received metadata signals from storage media to the media tracking system. Typically, at least some of the stationary locators are provided at egress portals for the controlled space, such as at a library or data access system and at a divide between the controlled space and a "free" or uncontrolled space.

In some preferred embodiments, the storage media is a tape or other storage media cartridge of a particular external form factor (e.g., size and shape), and the locator includes a housing in which the tag reader and communication module are positioned. The locator housing has the same form factor of the cartridge such that the locator can be received or positioned within a container or in a magazine used for shipping the cartridges and storage media contained therein. According to a further aspect of the invention, time stamps are provided by the locators, e.g., mobile and stationary locators, to the media tracking system, which uses this timing information along with the location information to verify compliance with a business process rule (e.g., expected locations of media, transport timing and route, or the like). Yet further, the locator or, in some cases, the storage media includes a sensor that senses physical characteristics of the media's environment or its own physical structure, and this sensed information is provided by the locator to the media tracking system for determination of compliance with business process rules (e.g., based on exposure to heat, moisture, magnetic and/or electric fields or the like).

According to another aspect of the invention, a method is provided for managing removable storage media. The method includes providing business processes in memory that each includes one or more rules associated with or applicable to the media to be managed. For example, the rules may define where the media should be located at a specific time or for periods of time, over which route the media should be shipped, what environmental conditions (or ranges of parameter values) should be maintained or avoided for the media, and other media management rules. The method continues with providing a media tracking system that can access the memory and that includes a media tracking manager or software applications that process the business processes so as to manage the storage media. Tracking data associated with a set of the storage media is received, and this tracking data may include one or more of location data, a time stamp or information, environmental or sensor-based data, and metadata. The media tracking system then operates to determine compliance with the rules of the business processes based on the received tracking data. The method continues with the media tracking system initiating a management process for at least one of the storage media in the set based on the business rules compliance determination. For example, the tracking data may include location and time information, the media tracking manager may determine the position of the particular storage media, compare this location with an expected or acceptable location defined in an applicable business process rule, determine there is non-compliance with the rule, and respond by initiating (or sending a message to) a security system to take appropriate actions (e.g., modify key management, modify custodial rights/access, and the like).

DETAILED DESCRIPTION OF THE PREFERRED EMBODIMENTS

The present invention is directed to methods and systems for tracking at least the physical location and typically the status of individual pieces of portable or removable data storage media. The media can be tracked using metadata tags placed on each piece of storage media and tag readers with wired or wireless communication capabilities to report location data and metadata for the media to a media tracking system and its location processor. Briefly, a removable data storage media tracking system is provided that includes removable media that has an internal or external tag (e.g., a radio frequency identification (RFID) tag) storing a unique ID and system generated data (e.g., volume serial number and/or other metadata).

Tag locators are provided that include tag readers and data communication modules for reading the data from the tag, communicating tag reading events, and, when the locators are mobile and not affixed at an egress point or at select locations (or "poles") within a controlled space, determining and communicating location information (such as global position satellite (GPS) data or the like). The tracking system and its software/applications are able to process this data to determine and verify the location and status of the media, to maintain location and movement histories, to provide alert and warning services, and/or drive or provide tag data such as violation of business process rules to a security system (e.g., an encryption key management system, a custody system, or the like). The tracking system is particularly suited for transport monitoring, and to this end, the system may include media locators that have the form factor of the media (or the media's housing such as a tape cartridge) to be inserted in a typical shipping container or tape magazine to allow the magazine-positioned locator to communicate with each or sets of the removable media within the magazine or container and report the content of the communications and location information to the tracking system.

Removable media has the unique quality of not being confined to a single location, which makes the management of the removable media relatively complex. The methods and systems of the present invention provide or facilitate integrated management of storage media by providing a complete picture of data storage. For example, the tracking methods provide status and location information about each piece of media regardless of whether the media is outside a data access system (e.g., tape library). This information can be accessed via a single console application that can be used to manage and monitor security, transport, efficiency, and costs associated with data storage. This is an expansion of existing storage resource manager (or SRM) toolsets. An example of this extended management is the tracking of removable media location and status, whereas such usage and movement patterns could not be monitored by prior SRM toolsets. Management operations on the removable media are also not executed via the prior SRM toolsets, whereas the integrated management system of the invention may be used to perform management operations including duplication, relocation, and disposition of removable media.

Removable media tracking, as explained in detail below, may be accomplished by using a combination of RFID, media library internal location tables, and GPS tracking devices. With these technologies or location/communication techniques, a removable piece of media may be in (and tracked/monitored in) at least four "locales" or physical domains. For example, the media may be within a data reader/writer device (e.g., a tape drive, a CD drive, or the like) or be within a data access system such as a tape library (e.g., within a storage slot or robotic arm within a library). Alternatively, the media may be ejected from the data access system or library but still within a controlled area of an enterprise (e.g., within a data center or in an offsite but controlled storage area). Further, the media may be in free space such as between two controlled spaces in transport where it may be in motion or stationary. The inventive tracking system and method provides the tracking technologies that can be used to track location and status of media within each of these four locales. The system and method also include the integrated management techniques and processes and tools that are useful for managing the removable media.

To practice the invention, the computer and networked devices, such as those used to form an enterprise system or customer enterprise, may be any devices useful for providing the described functions, including well-known data processing and storage and communication devices and systems with processing, memory, and input/output such as I/O ports, and server devices configured to maintain and then transmit digital data over a wired or wireless communications network. Data typically is communicated in digital format following standard communication and transfer protocols. The removable data storage media (or storage media or simply media) may take numerous forms of portable media such as magnetic tape or tape cartridges that include a standard form factor housing and magnetic tape, optical tape, magnetic disk, compact disk (CD), digital versatile disk (DVD), holographic media, or the like.

The metadata tags provided on the removable media may be any passive or active device useful for storing information and responding to or being powered by signals from readers, and in some embodiments, the tags are RFID tags, which are well-known. The metadata stored on the tags typically will include an ID for the media (which can be linked to stored content by the management software) and may include other useful information such as destination, ownership or return address information, status information, content information, physical media identification, usage patterns, or the like. Similarly, the media locators discussed herein are typically described as including a tag reader, antenna, and a power source. The readers typically communicate wirelessly with the tags (e.g., interrogate or awaken the passive tags) to read the metadata and to update or write the metadata. The wireless communication may be RFID based or be based on other wireless communication technologies such as one wire read/write chip, microwave, shortwave, wireless fidelity (Wi-Fi), Bluetooth, or the like. Further, the communication may be wired for fixed media locators such as those at egress points or wireless such as for those that are mobile, and to this end, each locator typically includes a communication module (e.g., a cellular or satellite based communication module) and this or another module is also typically used to receive raw location data from a satellite-based, cellular-based, or other location system (such as the Global Positioning System (GPS), the GLONASS system, or systems using cell phone technologies). In some embodiments, the communication modules utilized are GSM/GPRS modules or modems but other communication/location modules may be used to practice the invention. Two way communication between the manager or tracking application and the removable media is available in most embodiments of the invention to allow direct manipulation of the data and management of the media.

Figure 1:
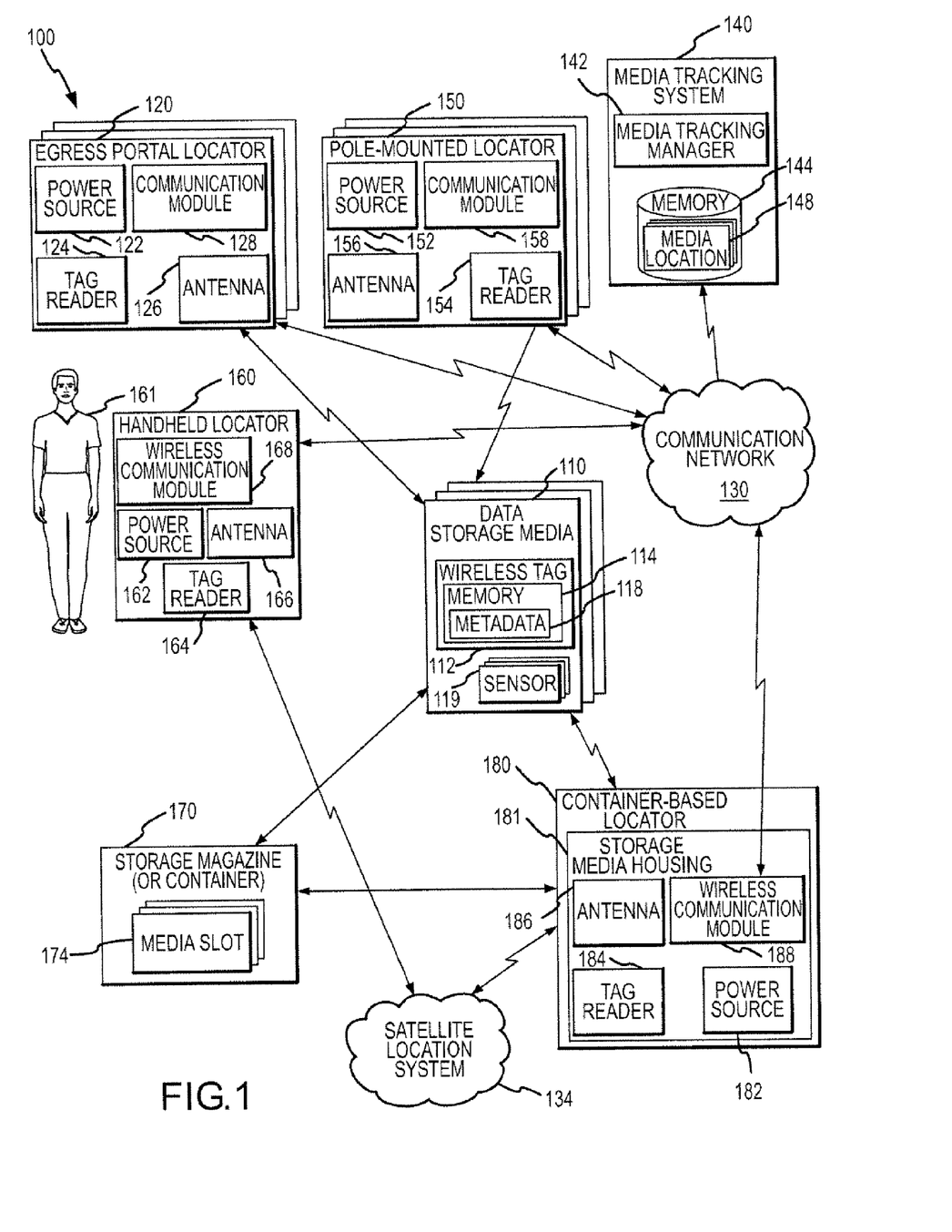
FIG. 1 illustrates a removable/portable data storage media tracking system according to one embodiment of the invention illustrating a variety of media location devices or locators that may all or selectively be used to practice the invention.

With this brief summary of the invention and explanation of some of the useful technologies for implementing the invention in mind, a more detailed description of exemplary embodiments of the invention is provided and tracking and media management operations performed by such systems are explained. FIG. 1 illustrates an integrated media management system 100 of an embodiment of the present invention that is useful for monitoring the location and status of removable data storage media 110. To this end, the system 100 includes a media tracking system 140 that may be made up of processing applications for processing location data from mobile readers, for processing read events by stationary readers, and for processing business process rules, and these processing applications can all be considered part of the media tracking manager 142. The media tracking system 140 also includes memory 144 for storing media location (and, in some embodiments, metadata and/or status information) 148 pertaining to the storage media 110.

Each data storage media 110 in the system 100 is shown to include a wireless tag 1112 with memory 114 for storing a set of metadata 118, e.g., ID, status, destination, or the like. For example, the wireless tag 112 may be a conventional RFID tag 112 that may be mounted on the media or in the media housing (e.g., within the housing of a tape cartridge). The wireless tag 112 does not typically include a power source but, instead, is typically configured to be powered or awakened when it receives an RF signal (such as with an antenna not shown) and can then transmit the contents of its memory 114, i.e., to transmit the metadata 118. Also, the tag 112 is preferably configured for the metadata 118 to be updated or written by locators or tag "readers" of the system 100 to allow status, usage history, or the like to be modified.

A sensor 119 is optionally provided with one or more of the media 110. The sensor or sensors 119 may be provided in or on the media 110 to allow the media tracking system 140 to monitor the status (e.g., physical characteristics of the media or its environment) and compliance with business process rules. For example, but not as a limitation, the sensor 119 may be a temperature sensor and its readings communicated by the wireless tag 112 to a locator of the system 100. This may be useful when the media 110 can be damaged by higher temperatures or under a business process rule to store the media 10 at temperatures below some maximum temperature. The temperature information may be communicated to the tracking system 140, which can check to see if the business process rule is being violated or may soon be violated (e.g., the sensed temperature is within a preset range of the maximum allowed storage temperature). Other useful sensors 119 may be a magnetic field sensor for determining when the media 110 is in a field that may be high enough to damage the media or its data, and business process rules may set limits of such magnetic fields depending upon the media composition or its particular content. Yet another sensor 119 may be a physical integrity sensor for the media housing, e.g., a low power electric circuit or the like. Again, the sensor 119 would sense physical or environmental parameters or characteristics pertaining to the media 110 that is transmitted via the wireless tag 112 to the locators of the system or in other embodiments, the sensor 119 is configured with a battery or other power source and only transmits when a preset value or level is exceeded (e.g., reports when a temperature is exceeded, when physical integrity is exceeded, or the like). While the sensor(s) 119 is shown to be provided on the storage media 110, in many embodiments, such sensors would instead or in addition be provided with the locators (such as one or more of locators 120, 150, 160, 180). In this way, the sensor(s) provided in the locator can be used to sense environmental parameters or characteristics for a plurality of the media 110 that are read or interrogated by such locators and the proximity of the locator typically will sense parameters that are relatively accurate for the proximate media 110 (e.g., temperature would typically be the same or similar within the interrogation range of the locator).

The system 100 is shown to include a variety of "locators" that are used to provide two-way communication with the tags 112 of the media 110 and, when mobile, to receive location information that can be used by the media tracking system 140 to determine the location of the media 110. As discussed above, it is desirable to monitor the location of the portable media 110 as it is moved about an enterprise facility (e.g., about a data center) and also when it is being transported (e.g., to or from an archive facility). To this end, the system 100 includes "fixed" or relatively stationary locators and mobile locators that each can communicate in a wired or wireless fashion via network 130 with the media tracking system 140.

As shown, the system 100 includes one or more egress portal locators 120. These locators 120 may be positioned at the exit or egress to a data access system or library (not shown) and at various egress points of a control space such as at data center doors. Degrees portal locator 120 is shown to include a power source 122 and a tag reader 124 (e.g., an RFID reader or the like) along with an antenna 126 for communicating with or reading/writing to the wireless tag 112 on the media 110. For example, the tag reader 124 may interrogate a media tag 112 as the media 110 is being moved through a portal (such as leaving or entering a library or data center). This portion of system 100 may be thought of as being "portal-based" tracking of media 110. At this point, the reader 124 may also write to the metadata such as to write a time stamp in the metadata, to indicate the "event" such as "removed from data access system", or the like The locator 120 is fixed and the portal location known, and hence, the locator 120 does not function to determine its location. Instead, it uses a wireless (or wired in some cases) communication module 128 to communicate the event to the media tracking system 140 via communication network 130 (e.g., wired or wireless network or a combination thereof). The communication modules, such as module 128 may be adapted with memory for at least temporarily storing and then later forwarding the metadata 118 from the tag 114. The sending of the metadata 118 may be automatic upon reading, may be in response to a query from the media tracking system 140, and/or be automatic but periodic. The memory of the module 128 may also be used to store the read metadata 118 when a communication link with the tracking system 140 cannot be established/verified (e.g., such as during problems with the network 130 or with the system 140 I/O devices or the system 140 or network 130 is unavailable).

The "event" reported may be considered an RFID or tag read, a read/write event, or the like and typically will include an ID of the locator, the read and/or written tag metadata 118, and a time of the read event (e.g., a time stamp and to this end, the locator will include a clock (not shown)). The metadata or read event data, time stamp, and locator ID information is stored by the media tracking system 140 in memory 144. The stored information typically will include a media location 148 of the media 110. In some embodiments, the tracking system 140 can be queried to retrieve a report (text or graph/map) of the location of the particular media 110 that corresponds to the read event reported by the portal locator 120 or this event/location may be reported preemptively if it is determined that the egress of the media 110 through the portal associated with the locator 120 violates a particular business process rule (e.g., a media 110 is not supposed to be removed from a data center or the like).

To track the media 110 outside of the library or data access system but within a controlled space or enterprise facility, the system 100 includes one or more pole-mounted (or fixed position) locators 150. These locators 150 may be positioned about a facility such as a data center so as to remove "dead spaces" and allow the location of the media 110 to be determined throughout the controlled space (or in desired areas within such space). For example, an RFID reader may have a limited range that it can read or communicate with a wireless tag 112 on a media 10 (such as 5 to 30 feet or the like). In these cases, the pole-mounted locators 150 may be provided in adequate number and in strategic positions within a space to be able to communicate with the media tag 112 throughout the space (or in the desired areas) such as by having overlapping communication/interrogation circular areas about each locator 150 in the space. In this manner, the pole-mounted locators (which as with the egress portal locators 110 include a power source 152, a tag reader 154, an antenna 156, and a communication module 158) are able to track the location and status of the media 110 between the egress portal locators 120, which is useful in many situations for media management (e.g., a media may be outside a library but not be misplaced outside a storage container or the like). As with locator 120, the locator 150 communicates with the tag 112 of media 110 and provides the read event such as the time stamp and metadata 118 to tracking system 140 for updating location information 148. Again, the location of the locator 150 is mown (or can be looked up based on the locator ID in the communication with tracking system 140) and the locator 150 does not need to provide location or positioning data (e.g., GPS data or the like). The pole-mounted locators 150 typically will operate periodically to poll or interrogate the media 110 within in its range and report read tag information to the tracking system 140 (e.g., poll once every minute, every 5 minutes, or shorter or longer polling periods).

The system 100 may include handheld or mobile locators 160. These devices, for example, may be carried on a belt of IT personnel 161 to be used instead of or in conjunction with pole-mounted locators 150 or by transport personnel 161 to read media 110 as part of transporting outside a controlled space (e.g., in place of container-based locator 180 in some embodiments). The handheld locator 160 is similar to the locators 120, 150 in that it includes a power source 162 (such as a rechargeable battery) and a tag reader 164 with antenna 166 (e.g., an RFID reader and antenna) for two-way communications with wireless tag 112 of media 110. However, the wireless communication module 168 differs from the communication modules 128, 158 in that it provides two functions. First, it is useful for communicating wirelessly via wireless communications network 130 with the tracking system 140, e.g., via satellite, cellular, or other technologies. Second, it is also useful for communicating with (e.g., receiving) positioning data from a satellite location system 134 and to transmit positioning or location data for the locator 160 to the media tracking system 140 via wireless communication network 130 (such as with the read event data, locator ID, and time stamp of the read event). For example, the communication module 168 may be equipped with a GPS receiver when the location system 134 is a GPS-based system and, in some cases, may be or include a GSM/GPRS modem with a GPS receiver.

The tracking system 140 uses the raw (or processed) position or location data to determine the physical location of the handheld locator 160 and indirectly the location of the data storage media 110 (e.g., within the range of the reader 164). This data 148 is then stored in memory 144 by the tracking system 140. While use of GPS-based positioning data may be used in some embodiments of the system 100, the concepts of the invention are useful for nearly all location systems (such as remote system 134) that provide positioning data associated with the physical location of the data storage media 110 to locators, such as handheld locator 160 or container-based locator 180 or other locators, that are positioned proximate to the media 110. The positioning data may include OPS data, GLONASS data, or other data from another satellite-based positioning system. In other cases, the remote system 134 may make use of other positioning technologies to provide the positioning data used by the media tracking manager 142 in identifying or calculating the physical location of the locators 160, 180 and, therefore, a read tag 112 and associated media 110. For example, but not as a limitation, cell phone locating techniques and systems may be used such as Cell ID techniques (e.g., a mobile unit sends the ID of the cell tower antennae, the physical location of the cell tower is known, and the mobile unit is near the cell tower), time of arrival (TOA) techniques (e.g., time of arrival of a signal at a tower from a mobile unit is used to triangulate location of the mobile unit), angle of arrival (AOA) techniques (e.g., the angle of arrival of signals at a tower is used to determine location relative to the tower), E-OTD techniques (e.g., a technique similar to TOA but with hardware provided at mobile unit instead of at tower). Those skilled in the related arts will understand that the use of "location information" and "positioning data" is meant to be construed broadly to cover nearly all information that can be communicated to the locators of the systems of the invention for use in determining the physical location of the locator and nearby tagged storage media.

Significantly, the system 100 is also useful for tracking the location and position of media 110 during transport from a controlled space (e.g., a data center) to and from an archive facility or storage warehouse, i.e., in "free space." Typically, the media 110 is shipped in a storage magazine or shipping container 170 that is especially adapted with slots, receiving shelves, or the like 174 having a particular form factor for receiving media with particular outer dimensions/shapes (e.g., a particular brand/model of tape cartridge). The magazine 170 includes numerous slots 174. The location of media 110 in the magazine 170 can be determined with the handheld locator 160 such as by a driver of a van or truck used to ship the container 170.

In some embodiments, though, a container-based locator 180 is positioned in a media slot 174 (or mounted otherwise in or on the magazine 170). The container-based locator 180 is similar to the handheld locator 160 in that it includes a power source 182, a tag reader 184, an antenna 186, and a wireless communication module 188 adapted for receiving positioning data and also for communicating via wireless network 130 with tracking system 140. Further, the locator 180 provides these components within a storage media housing 181 that has the same form factor (e.g., external dimension and shape) as the data storage media 110 or that has dimensions/shape that allow it to be inserted into a media slot 174. In this manner, the container-based locator 180 is library and magazine agnostic and the locator 180 can be used in any shipping container 170 designed to receive and securely ship media 110 (e.g., with slots 174 to receive media 110 and its housing). In a typical shipment a number of magazines 170 would be transported and in some cases, to differing destinations. With the use of the container-based locator 180, a locator 180 would remain with each magazine and the media contained in the magazine 170. The locator 180 typically would periodically poll or interrogate the media 110 in the slots 174 and transmit a read event to the tracking system 140 with its position data from satellite location system 134. The tracking system 140 then determines the location of each media 110 in the magazine 170 and updates the stored information 144. The tracking system 144 may also act to determine if the determined location is expected based on an expected transport schedule or process (geographic route and time schedule).

As shown, the locators of the system 100 typically include a tag reader or interrogator device and antenna, a communication module for communicating with the tracking system 140 and, in some cases, with the satellite location system 134 (e.g., include components necessary for obtaining positioning data from a remote system 134 such as satellite-based or cellular-based receiver/transmitter/processor devices). The locators may also include sensors (not shown) and one or more power sources. The "tracking data" gathered by the locators generally includes at least a portion of the metadata read from the tags associated with the storage media. The tag data may also include location information (such as positioning data from the location system 134, e.g., CPS, GLONASS, cellular phone, or the positioning data), time information or time stamps (e.g., from an onboard clock, from the location system 134, or the like), and sensor-based information (e.g., temperature information, magnetic field information, or the like from the sensors on the media 110 or provided on or in the locators). As was explained above and is explained below in more detail, the tracking data or select portions of it may be fed to the media tracking system 140 for use in performing management tasks associated with the storage media, and these processes may be defined by business process rules (e.g., custody rules, security rules, handling and storage rules, shipping rules, and the like). In other words, the media tracking manager 142 not only provides the functions of processing the location information to determine and track the locations of the storage media 110 but also can use some or all of the tag data to facilitate the overall management of the storage media 110.

Figure 2:
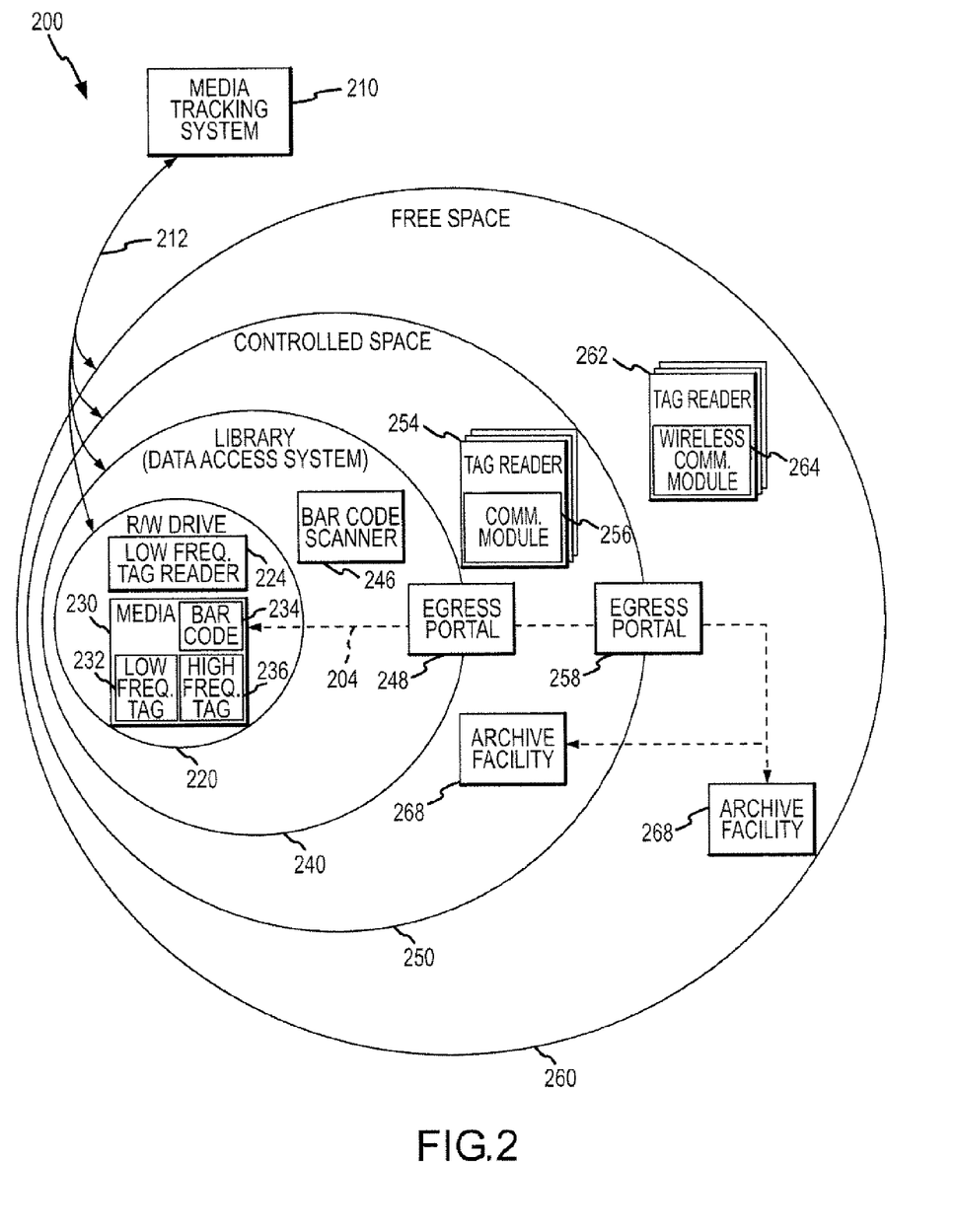
FIG. 2 illustrates schematically a removable data storage media tracking system showing the use of a variety of technologies to track location of a storage media from a read/writer through a data access system to controlled space to free space.

FIG. 2 illustrates in a more schematic manner an integrated media management system 200 of the invention. The system 200 is useful for tracking and managing removable media 230 in a variety of locales or physical domains. To this end, the system 200 includes a media tracking system 210 that communicates (e.g., wired or wireless network communications) with components of each of these locales. As shown, the system 200 includes four locales that include a read/write drive 220, a library or data access system 240 in which the drive 220 is located and that is useful for selectively positioning media 230 in the drive 220, a controlled space 250 such as a data center or other controlled area of a building housing the library 240, and free space 260 that includes any area outside the controlled space 250 such as a transport route between the controlled space 250 and archive facility 268 (which in turn may include a controlled space (not shown)).

The media 230, such a tape cartridge, a disk, or the like, includes a low frequency tag 232, an external bar code or scannable tag 234, and a high frequency tag 236 (such as RFID tag as discussed for media 110 of FIG. 1). In the read/write drive 220, a low frequency tag reader 224 is provided to read tag 232 to determine whether the media 230 is the correct or expected media 230. The location of the media 230 is then communicated 212 to the media tracking system 210 (directly or via a control data set module as discussed relative to FIG. 3). The media 230 may be moved about the domains as shown with dashed line 204. When the media 230 is moved into the library 240 a bar code or other scanner 246 may be used to read the bar code 234, and the location of the media 230 may then be communicated 212 to the tracking system 210 (again, directly or via a control data set module).

Significantly, the media 230 may also be tracked in the controlled space 250 outside the library 240. To this end, the media 230 may be moved 204 through an egress portal 248 of the library 240. The controlled space 250 uses high frequency tag readers 254 with wireless (or wired) communication modules 256 to interrogate and write to the high frequency tag 236 of the media 230. The read event along with a time stamp, the reader/portal ID, and metadata are communicated 212 to the tracking system 210. Pole or mobile readers 254 may be used to monitor the movement of the media 230 within the controlled space 250 with read events reported to the tracking system 210.

When the media 230 is moved 204 outside the controlled space 250, the media 230 is shown to pass first through an egress portal 258 and again a reader 254 is used to read/write the high frequency tag 236 and report the read event to the tracking system 210. In the free space locale 260, additional high frequency tag readers 262, such as mobile or handheld locators and/or container-based locators with wireless communication modules 264 (e.g., GPS receivers and GSM/GPRS modules), are used to interrogate the media tag 236 and pass the metadata and positioning information (along with a reader ID and time stamp) to the tracking system 210. In this manner, the location and status of the media 230 can be tracked by the tracking system 210 throughout the free space, e.g., over its transport route 204 to archive facility 268 (and within the facility 268). The combined use of the tracking techniques allow the tracking system 210 to determine the location and status of the media 230 in each of the illustrated four locales 220, 240, 250, 260 and this media information can be used to manage the media in system 200 and/or to verify compliance with business process rules.

Figure 3:
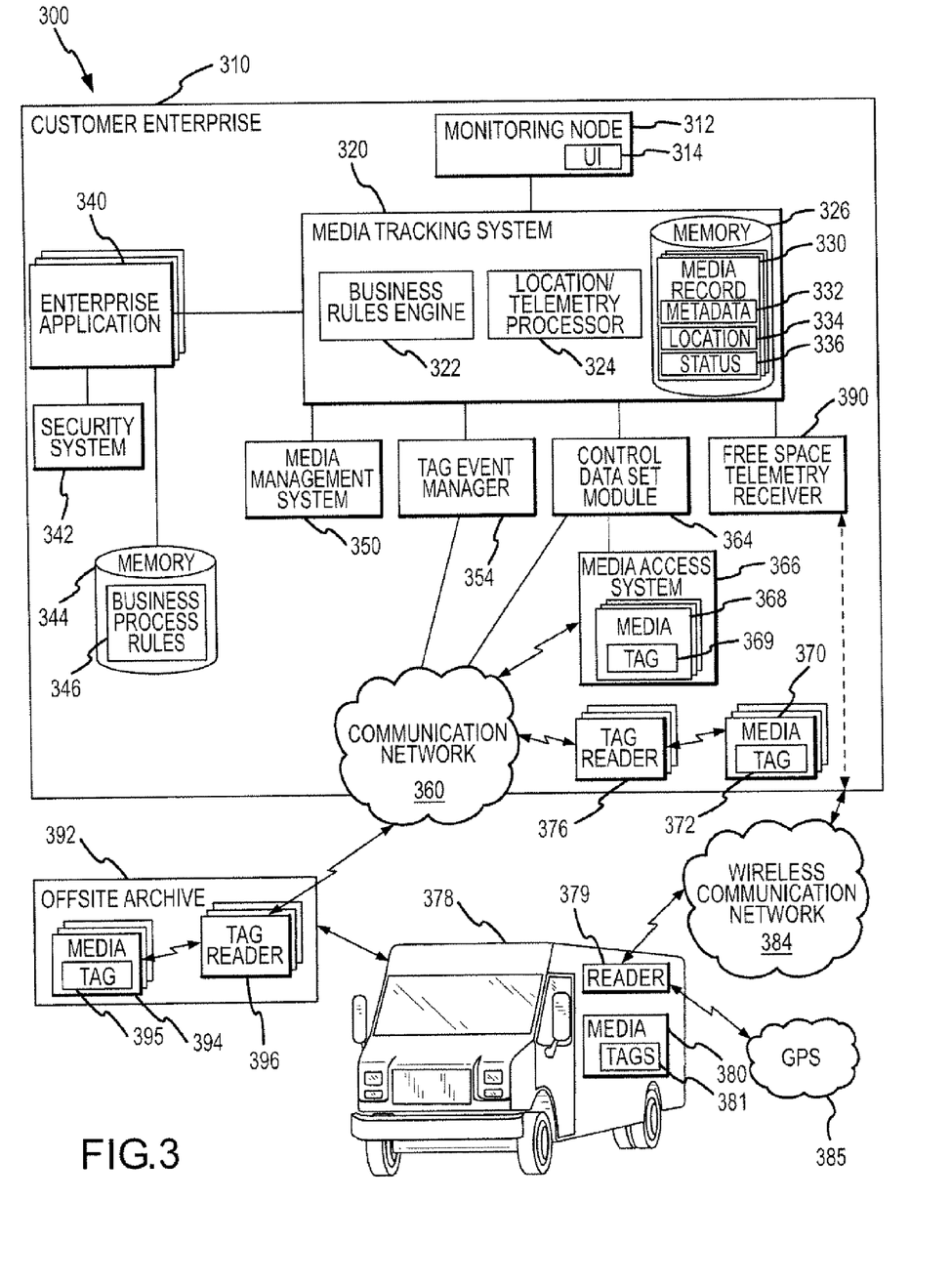
FIG. 3 is a block diagram of an integrated media and data management system incorporating the media tracking features of the present invention.

FIG. 3 provides another illustration of an integrated data storage media management system 300 of the invention. The system 300 is shown with more detail as to an exemplary customer enterprise 310 configured to implement the tracking methods/processes of the invention. The enterprise or customer network/system 310 includes a monitoring node 312 such as a personal, desktop, laptop, or handheld computer with monitor is provided with a user interface (GUI or the like) 314 that can be used by an individual to monitor the location or status of individual or sets of portable or removable media in the system 300. For example, a person responsible for particular media may wonder where particular media is located (e.g., "where are the set of tapes related to accounting for the third quarter?" or the like). The user interface 314 can be used to query (such as with the media IDs or other identifying information such as content searches) the media tracking system 320, which responds by providing location information requested for each of the media in the set.

To this end, the media tracking system 320 includes a business rules engine 322, a location/telemetry processor 324, and memory 326 storing media records 330 that are shown to include media metadata 332, location information 334, and status/other information 336. Enterprise applications 340 may communicate with the media tracking system 320 to use the location or other information from the media record 330. For example, a security system 342 such as camera information and portal tracking systems may be used by a security enterprise application 340 to monitor compliance with security rules, which may be stored in memory 344 in business process rules 346. The location of media 334 may be used by the application 340 to determine whether security rules have been violated (e.g., removing of a tape or disk from a secure or controlled area without authorization). The tracking system 320 uses business rules engine 322 to compare media locations 334 with business process rules 346. For example, a business process rule 346 may call for a media to be stored in particular area or location within a controlled area when not in a library, and the location information 334 can be used to verify such compliance. As another example, the rules 346 may call for the media to be stored at certain temperatures, outside high magnetic fields, or the like or to be transported along a certain route in a certain amount of time, and compliance with each of these rules 346 can be verified by the business rules engine 322.

The location/telemetry processor 324 is provided to process read events, raw location information, and other information from the various tag readers or locators to determine the location of the media and its status. This information is used to populate the media records 330 and may include the read (or recently written) metadata 332, the location of the media 334, and the media status 336 (e.g., in transport, in drive, in data access system, in short term storage, in archive, or the like). Media management is integrated in system 300 as the media tracking system 320 interacts with a media management system and/or application 350 that is used to manage the media including its location, duplication, archiving, and the like. The tracking system 320 is also linked with control data set module 364 that is typically linked in turn to the library or media access system 366 in which media 368 with tags 369 (low frequency, high frequency, and/or bar code tags) are positioned for read and write access. As discussed with reference to FIG. 2, the control data set module 364 can be used to provide status and location information for media 368 for storage in memory 326 and use by tracking system 320 in responding to queries from monitoring node 312, enterprise applications 340, and/or media management system 350.

Within the customer enterprise 310, the system 300 also includes (or access to) a communication network 360 such as wired or wireless LAN, WAN, intranets, the Internet, or the like which is used to facilitate communication with a tag event manager 354 that is used to process at least a portion of the read events from tag readers or locators. When the tags on the media are RFID tags, the event manager 354 may be a Java RFID event manager that processes read events and provides the information to tracking system 320 for further processing and/or storage. To track the media 370 with tags 372 within the enterprise 310 spaces but outside the library or access system 366, the system 300 includes tag readers or locators 376 such as egress portal locators, pole locators, and, in some cases, mobile locators/readers 376 (e.g., J2ME tag readers or the like). These readers 376 communicate tag reads over the communication network 360 to the tag event manager 354 and to the tracking system 320.

To track media 380 with tags 381 (such as RFID tags) in the free space outside the enterprise control space 310, the system 300 includes a free space telemetry receiver 390 that is linked to the media tracking system 320 and processor 324. The receiver 390 is used to receive location and other information over wireless communication network 384 (such as GSM or other communication systems) from mobile or container-based tag reader or locator 379. The locator 379 (e.g., a J2ME tag reader/GSM/GPS unit or the like) in turn interrogates the tag 381 of media 380 and receives positioning data from the GPS or other positioning system 385. As shown, the locator 379 and media 380 are in a transport vehicle 378 (e.g., a truck, van, or car is shown but other vehicles may be used) that may be stationary or moving along a route to offsite archive 392. When the media 394 is in the archive facility 392, a tag reader 396 in a container, a handheld, or portal/pole locator may be used to interrogate and write to tag 395 of media 394, and then report via network 360 the read event (e.g., metadata, time stamp, location or reader ID, and other information as discussed above) to the event manager 354 and tracking system 320.

Figure 4:
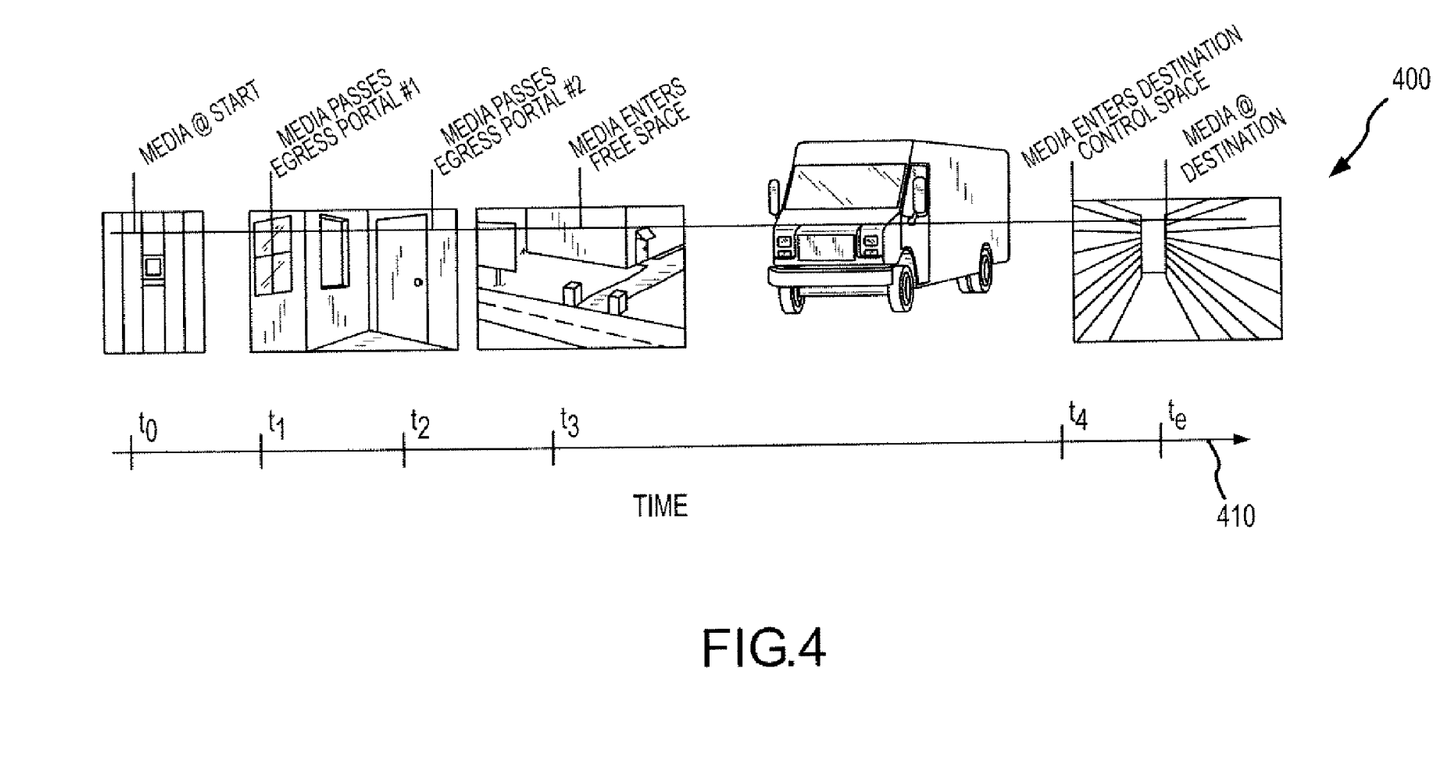
FIG. 4 illustrates with a timeline "events" that can be monitored with the tracking system of the invention to verify compliance with business process rules.

Discussion has been provided in this description of how the tracking system may be utilized to track the location of media and to verify compliance with business process rules. It may be useful to discuss an example of tracking media from a library to an archive facility to further illustrate this process. FIG. 4 illustrates a tracking process 400 with a timeline 410 with a number of events that occur at particular times (i.e., times $t_0$ to $t_e$). For example, a set of media may be scheduled to be transferred from a library to an archive, and this transport process may be defined by a set of business process rules, such as by providing a time period for completion of various segments of the journey or transport and a particular or general geographic route (e.g., transfer from Washington, D.C. to Pittsburgh, Pa.). In other words, each segment of the transport process has an expected time interval (e.g., $t_1$-$t_0$ for the first segment). Movement events are automatically detected and logged at portal egresses using the ID and GSM technology that communicate with an enterprise-based application (e.g., the locator and tracking system techniques discussed above). When a time interval plus an accommodation or tolerance factor is exceeded the tracking system (or its business rules engine) may perform a predefined action to preemptively minimize potential damage or loss, e.g., send queries to shipping company, send warnings to responsible personnel in the enterprise such as personnel in that control custody of media, send information such as loss of control message to a security system, e.g., a key management system, such that the security system may operate based on the violation of the business process, or other actions.

As shown, the media transport and tracking process 400 includes a first event that involves the media being at a start point, such as in a data access system or library. At time $t_1$, the media passes through a first egress portal at which point a tag locator polls the tagged media and report the event to the tracking system. The media is now traveling through the control space and at time $t_2$, the media passes out of the controlled space through a second egress portal and this transfer may be expected to take a relatively short period of time. The media at time $t_3$ in free space (e.g., in a shipping container or magazine). During the time interval ($t_4$-$t_3$), the media is expected to be shipped from the enterprise facility (e.g., Washington, D.C.) to the archive facility (e.g., Pittsburgh, Pa.). A locator provided in the shipping vehicle (such as a handheld locator or container-based locator) is used to periodically poll the media and communicate the read event information and positioning information to the media tracking system. The media tracking system determines the location of the media and compares this information along with the time stamp to determine whether the transport is complying with a business process rule i.e., the planned transport schedule and route.

For example, the tracking system may determine that the location does not make sense for trip between the enterprise and archive (e.g., from Washington, D.C. to Pittsburgh, Pa.) or that too much time has elapsed. In either case, the tracking mechanism can respond to queries as to the location of the media during transport and, in some cases, may automatically transmit messages to the shipping company or responsible personnel when preset variances are detected. As discussed above, sensors may be used to detect physical status or environmental characteristics for the media, and this information can also be used to verify compliance with business process rules (such as heat, moisture, physical integrity, magnetic/electric fields, and the like).

According to some embodiments of the invention, users are able to query and monitor sets of media. For example, a set of media may be used as a set to store related data and for the information to be recovered or to be useful all the media in the set may be needed. In this case, the tracking system of the invention can be used to determine the location and status of multiple media and report the information to a user or operator.

The management of storage media is significantly improved through the use of the above-described media tracking systems, and, therefore, it may be useful to provide further detail on methods that can be used to manage storage media including the enforcement of one or more business processes and associated rules. For example, a security system may be provided in the controlled space 250 of the system 200 of FIG. 2. In this case, the media tracking system 210 may act to gather tracking data (e.g., location information, a time stamp or information, sensor information, and/or metadata). The media tracking system 210 may further function to access one or more business processes and any rules that are provided by such processes. The rules may generally define how storage media may be used, where it can be located, stored, shipped, and the like (each of which may vary with time and/or with the particular piece of storage media), acceptable environmental conditions for the storage media, and otherwise define use and management of storage media. The tracking system 210 may then be used to compare the tracking data for each of the storage media to determine compliance with such rules. Management of the media is greatly improved because compliance can be verified for all storage media in a system (e.g., system 200) on an ongoing basis and also prompt action or management activities can be initiated when non-compliance is detected.

For example, a manager module (e.g., one or more software applications) may be used to process the tracking data for each storage media with it being stored in memory for later use (e.g., see memory 144 used by manager 142). The manager module may determine that a particular storage media has a location that is outside a controlled space at a particular time when it was defined by a business process as being within the controlled space or that it traveled over an unexpected path before arriving at an archive facility. In either of these cases, the storage media could be thought of as being non-compliant with a rule of a business process. The business process may define a management action to take when such a non-compliance (e.g., a loss of control) occurs for a set of storage media. Note, it is foreseen that the rules, business processes, and/or management actions may differ among storage media managed within an enterprise or system (e.g., vary with media type, with contents of the media, with applications that use the media, and the like). For example, the manager module may apply a media quarantine on the non-compliant storage media, which may result in the blocking of later use of the storage media until the quarantine is lifted (e.g., prevent use of the media by an application to limit risks associated with using data on the media). In one case, the tracking system and management module are tied into or communicatively linked/networked to a controlled space or other security system. In this case, the defined management action may be to transmit a message to the security system, which may respond in a number of ways such as to block egress of the media through any secured portals, may result in encrypt/decrypt key management being adjusted to account for the loss of control of the media (e.g., by refusing a later request for a decryption key for the storage media), may result in attaching a flag to badge of a custodian of the media so as to block secure access, or the like. All of these activities may be considered as initiating management processes based on a compliance or non-compliance determination for a storage media.

The initiation of a management process may involve a custodial association for the storage media using the tracking data. In some embodiments, upon initial egress from a library (such as library 240 of FIG. 2 or a data access system), a custodial association between a person and the asset/storage media is automatically created by the media tracking system alone or in conjunction with a custodial (or security) system through a read of one or more tags, a capture of badge identification data, and/or photographic identification of a person who as identified as the custodian of the asset(s). Custodial identification can also be reestablished at every egress/ingress point. This custodial association to the asset(s) can then be applied to test conformance to a business process using data associated with the custodian derived from a security database as well as content and business process databases. A responsive action to a business process non-conformance as identified by the management module may result in the security system suspending the custodian's access credentials pending management inquiry (e.g., the custodian's badge, access codes, or the like may be suspended from entry/exit relative to controlled spaces).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. As described, the integrated media management system and method with its media tracking functionality is able to automatically detect and log movement of media at portal egress, such as by using RFID technology and GPS or other technology for determining a physical locations of tags and tagged media. The system and method also can be used to automatically create and manage associations with other applications to link metadata on tags to storage media and to the physical location of that media. The system and method can be thought of as an information delivery system that creates contextual associations from data points defining identity of media, chronology (e.g., using the event-related time stamps), media content, and location for portable media. From these associations, point-in-time validations of media transport and handling/storage processes (or compliance with business process rules) can be performed by the tracking system. Further, physical location inquiries of information residing on portable media can use a wide range of search arguments. In some embodiments, graphical or map-based reports can be provided to identify media and its location is generated and provided to a user through use of metadata associated with the information stored on the media and positioning information processing.

We claim:

1. A system for tracking removable data storage media, comprising:

a plurality of storage media comprising media for storing data and each including a wireless tag storing metadata and adapted to respond to an interrogatory signal by wirelessly transmitting a signal comprising the metadata;

a locator comprising a tag reader transmitting the interrogatory signals to the wireless tag and receiving the metadata signals from the wireless tags and further comprising a communication module receiving location data and sending signals comprising the received location data and the received metadata signals;

a media tracking system receiving the signals from the locator and determining locations of the plurality of storage media; and a cartridge housing the storage media, wherein the cartridge has an external form factor, and wherein the locator further comprises a housing in which the tag reader and communication module are positioned, the locator housing having the external form factor of the cartridge, whereby the locator is receivable in a magazine used to ship or store the storage media, wherein each of the signals transmitted by the locator comprises a time stamp indicative of a time of the receipt of the metadata signals from the plurality of storage media and wherein the media tracking system associates the time stamp with the determined locations, and wherein the media tracking system operates to receive a business process rule pertaining to one of the plurality of storage media and to verify compliance with the business process rule by processing of the time stamps and the determined locations.

2. The system of claim 1, wherein the media tracking system further operates to associate the determined locations for the storage media with the metadata and an identifier for each of the plurality of storage media.

3. The system of claim 1, wherein the location data comprises positioning data from a remote system associated with a physical location of the wireless tag and the media tracking system comprises a module for performing the determining of the locations using the positioning data.

4. The system of claim 1, wherein the wireless tags comprise radio frequency identification (RFID) tags, the interrogatory signal comprises an RF signal, and the tag reader comprises an RFID reader.

5. The system of claim 1, further comprising a plurality of stationary locators in or near a controlled space, wherein the stationary locators each comprise a tag reader for periodically transmitting the interrogatory signals to the wireless tag and receiving the metadata signals from the wireless tags and further comprise a communication module for communicating the received metadata signals and an identifier associated with each of the locators to the media tracking system.

6. The system of claim 5, wherein at least some of the stationary locators are provided at egress portals for the controlled space, one of the egress portals being an egress point between the controlled space and a data access system configured for accessing the stored data on the plurality of storage media and another one of the egress portals being an egress point between the controlled space and a free or uncontrolled space.

7. The system of claim 1, wherein the plurality of storage media further each comprise or the locator comprises a sensor sensing information regarding a physical characteristic of an environment about the storage media or of the storage media itself and wherein the locator transmits the sensor information to the media tracking system where it is compared to a business process rule.

8. A removable media tracking system, comprising:
a plurality of storage media each comprising an RFID tag storing metadata;
locators positioned at egress portals for a controlled space, each of the locators comprising a tag reader for reading the metadata from the RFID tags and a communication module for transmitting a signal in response to each of the readings of the metadata;
a mobile locator comprising a tag reader for reading the metadata from the RFID tags and a wireless communication module obtaining positioning data and transmitting a signal in response to each of the readings of the metadata including the received positioning data; and
a media tracking system receiving the signals from the locators and the mobile locator and determining physical locations for each of the plurality of storage media associated with the signals,
wherein the mobile locator comprises a housing with an external form factor similar to an external form factor of the storage media, the tag reader and the wireless communication module for the mobile locator being positioned in the housing, and the system further comprising a shipping container with slots for receiving a number of the storage media and the mobile locator housing, whereby the mobile locator is operable to periodically read the metadata from the RFID tags of the number of the storage media in the shipping container;
wherein each of the plurality of storage media further comprises a sensor operating to sense an environmental parameter for the associated storage media and to transmit the sensed environmental parameter to one of the locators, and
wherein the media tracking system operates to process the sensed environmental parameter to verify compliance with a business process rule applicable to the associated storage media.

9. The system of claim 8, further comprising a plurality of locators positioned in the controlled space between the egress portals, each of the locators comprising a tag reader for reading the metadata from the RFID tags periodically when the RFID tags are within a preset distance of the tag reader and a communication module for transmitting a signal in response to each of the readings of the metadata to the media tracking system.

10. A system for tracking removable data storage media, comprising:
a plurality of storage media comprising media for storing data and each including a wireless tag storing metadata and adapted to respond to an interrogatory signal by wirelessly transmitting a signal comprising the metadata;
a locator comprising a tag reader transmitting the interrogatory signals to the wireless tag and receiving the metadata signals from the wireless tags and further comprising a communication module receiving location data and sending signals comprising the received location data and the received metadata signals; and
a media tracking system receiving the signals from the locator and determining locations of the plurality of storage media,
wherein the plurality of storage media each further comprise or the locator comprises a sensor sensing information regarding a physical characteristic of an environment about the storage media or of the storage media itself and wherein the locator transmits the sensor information to the media tracking system where it is compared to a business process rule and
wherein each of the signals transmitted by the locator comprises a time stamp indicative of a time of the receipt of the metadata signals from the plurality of storage media, wherein the media tracking system associates the time stamp with the determined locations, and wherein the media tracking system operates to receive a business process rule pertaining to one of the plurality of storage media and to verify compliance with the business process rule by processing of the time stamps and the determined locations.

11. The system of claim 10, wherein the location data comprises positioning data from a remote system associated with a physical location of the wireless tag and the media tracking system comprises a module for performing the determining of the locations using the positioning data.

12. A removable media tracking system, comprising:
a plurality of storage media each comprising an RFID tag storing metadata;
locators positioned at egress portals for a controlled space, each of the locators comprising a tag reader for reading the metadata from the RFID tags and a communication module for transmitting a signal in response to each of the readings of the metadata;
a mobile locator comprising a tag reader for reading the metadata from the RFID tags and a wireless communication module obtaining positioning data and transmitting a signal in response to each of the readings of the metadata including the received positioning data; and
a media tracking system receiving the signals from the locators and the mobile locator and determining physical locations for each of the plurality of storage media associated with the signals,
wherein the mobile locator comprises a housing with an external form factor similar to an external form factor of the storage media, the tag reader and the wireless communication module for the mobile locator being positioned in the housing, and the system further comprising a shipping container with slots for receiving a number of the storage media and the mobile locator housing, whereby the mobile locator is operable to periodically read the metadata from the RFID tags of the number of the storage media in the shipping container.

13. The system of claim 12, wherein the media tracking system is operable to store the determined locations providing an association to the metadata and to respond to a query providing information matching a portion of the metadata for one of the storage media by providing the location and the metadata for the one of the storage media.

* * * * *